United States Patent
Friesen (10) Patent No.: US 8,260,737 B2
(45) Date of Patent: Sep. 4, 2012

(54) DYNAMIC SERVICE SELECTIONS USING ENHANCED ONTOLOGIES

(75) Inventor: Andreas Friesen, Steinfeld (DE)

(73) Assignee: SAP AG, Walldorf (DE)

( * ) Notice: Subject to any disclaimer, the term of this patent is extended or adjusted under 35 U.S.C. 154(b) by 735 days.

(21) Appl. No.: 12/415,265

(22) Filed: Mar. 31, 2009

(65) Prior Publication Data

US 2009/0254506 A1 Oct. 8, 2009

(30) Foreign Application Priority Data

Apr. 3, 2008 (EP) .................................... 08400022

(51) Int. Cl.
*G06F 17/00* (2006.01)
*G06N 7/00* (2006.01)
*G06N 7/08* (2006.01)

(52) U.S. Cl. ......................................................... 706/55
(58) Field of Classification Search ...................... 706/55
See application file for complete search history.

(56) References Cited

U.S. PATENT DOCUMENTS

2010/0070448 A1* 3/2010 Omoigui ......................... 706/55

OTHER PUBLICATIONS

Drumm,C. et al. "WP5: Service Mediation D5.8b Final Prototype of Mediation and Composition in a Real World Scenario" FP6-507483 Deliverable D5.8b. DIP: Data, Information and Process Integration with Semantic Web Services. Nov. 24, 2006. 30 pages.*
Friesen, A. et al., "Semantic Web Service Discovery and Selection in B2B Integration Scenarios" Lecture Notes in Computer Science, vol. 4636 (Sep. 3, 2007), pp. 338-343.
Afandi, R. et al., "AMPol-Q: Adaptive Middleware Policy to Support QoS", LNCS, vol. 4294 (Jan. 1, 2006), pp. 165-178.
Tan, Y.-S., et al., "Service Domains" IBM Systems Journal, IBM Corp, vol. 43, No. 4 (Sep. 1, 2004), pp. 734-755.
European Search Report for EP Application No. 08400022.3, mailed on Nov. 19, 2008, 7 pgs.

* cited by examiner

*Primary Examiner* — Jeffrey A Gaffin
*Assistant Examiner* — Benjamin Buss
(74) *Attorney, Agent, or Firm* — Brake Hughes Bellermann LLP (57) ABSTRACT

Embodiments may include a system for generating an enhancement of an ontology. The system may have a memory unit and a processing unit. The memory unit may be configured to provide the ontology and to store the ontology with the enhancement. The processing unit may be configured to identify a service specification, such as a service product or a contract, that may be represented by a class of the ontology. The service specification may describe a capability of a service. The processing unit may be further configured to compute a set of instances that are specified by the service specification and by a requirement specification and to enhance the ontology with a generated class representing the set of instances in case that the set of instances has one or more instances.

20 Claims, 7 Drawing Sheets

Shipment ⊑ (=1 shipFrom.Location)
      ⊓ (=1 shipTo.Location)
      ⊓ (=1 shipItem.ShippingItem)

WSCapabilityX ⊑ (=1 shipFrom.(Europe ⊔ NorthAmerica))
      ⊓ (=1 shipTo.(Europe ⊔ NorthAmerica)
      ⊓ (=1 shipItem.( (Parcel ⊓ Parcel.hasWeight <=70kg)
          ⊔ Document) )
      ⊓ Shipment RuleConditionY ⊑ (=1 shipItem.( (Parcel
      ⊓ Parcel.hasWeight >20kg) ) )

RuleConditionY_WSCapabilityX ⊑
      (=1 shipFrom.(Europe ⊔ NorthAmerica))
      ⊓ (=1 shipTo.(Europe ⊔ NorthAmerica))
      ⊓ (=1 shipItem.( (Parcel ⊓ (Parcel.hasWeight >20kg ⊓
          Parcel.hasWeight <=70kg) ) ) )
      ⊓ Shipment RequestA ⊑ (=1 shipFrom.Frankfurt)
      ⊓ (=1 shipTo.NewYork)
      ⊓ (=1 shipItem. ( (Parcel ⊓ Parcel.hasWeight = 30kg) )
      ⊓ Shipment

Fig. 3

```
BROrder = Seq(
{ruleCondition } or {Par(Set of ruleConditions)}
{ruleCondition } or {Par(Set of ruleConditions)}
... )

Definition of the condition:
ruleCondition ≡ (somePropertyX.RangeRestriction ⊓ somePropertyY.RangeRestriction
⊓ ...) ∈ RuleConditions Add ruleCondition to BROrder
```

FIG. 4A

```
If (ruleConditionNew ⊑ ruleConditionOld) and (ruleConditionNew ≠ ruleConditionOld)
then If order(ruleConditionOld) < order(ruleConditionNew) then Insert ruleConditionNew in BROrder directly before ruleConditionOld
```

FIG. 4B

```
ruleCondition ∈ RuleConditions
FORALL wsCapability ∈ WSCapability in ontology {
IF (IsConsistent (ruleCondition ⊓ wsCapability)) then add to LocalStore
}
LocalStore stores generated rule:
        ruleCondition_wsCapability ≡ (ruleCondition ⊓ wsCapability) ∈ Rules
```

FIG. 4C

FORALL rule_wsCapability ∈ Rules

If selected(rule_wsCapability) then add to ontology rule_wsCapability ∈ AssignedRules

Fig. 4D

Initialize TriggeredRules := ∅

FORALL rule ∈ AssignedRules in ontology {
    If Request ⊑ rule then rule ∈ TriggeredRules
}

DYNAMIC SERVICE SELECTIONS USING ENHANCED ONTOLOGIES

CROSS-REFERENCE TO RELATED APPLICATION

This application claims priority under 35 U.S.C. §119 to European Patent Application EP 08 400 022.3, filed Apr. 3, 2008, titled "DYNAMIC SERVICE SELECTIONS USING ENHANCED ONTOLOGIES," which is incorporated herein by reference in its entirety.

TECHNICAL FIELD

Embodiments relate generally to the field of electronic data processing and more particularly to the field of software architecture of services.

BACKGROUND

Ontologies may be defined as data structures that are used to describe entities and dependencies between the entities. An entity may be represented by a class or concept of an ontology. Such a class may have a characteristic that may for example point to a different class and thus specify a range of the characteristic. Furthermore, a class may have an inheritance relation to a further class, that is, the class inherits the characteristics of the further class.

Ontologies may be used, for example, to describe web services by specifying the capabilities of the web services in relation to general or potential capabilities. With such an ontology, a reasoner may be used to identify in an automated way a web service that is capable to fulfill requirements of a service request. In an example of a dynamic service selection, a service request may be received by a computer system and the computer system may use a reasoner to subsume the service request under a class representing a web service. The web service thus selected may then be invoked to fulfill the service request and it is ensured that the selected web service is capable of fulfilling the service request. Further examples may include more general services that represent modular software programs that may be invoked by a different software program through a communication means.

SUMMARY

A first embodiment is a system for generating an enhancement of the ontology. The system may compute a set of instances that are specified by a service specification and that are specified by a requirement specification. The service specification may be represented by a class of the ontology. Accordingly, the set of instances may be represented by a generated class with which the ontology may be enhanced. The generated class may be used to represent the service capabilities and the requirement and the generated class is accessible to a service selection.

A further embodiment is a method for generating an enhancement of the ontology. The method may share features of the system in order to obtain a solution that may be also efficient, reliable and highly usable compared to different solutions.

A further embodiment is a computer program product that relies on features of an embodiment of the method so that the computer program product may also be efficient, reliable and highly usable.

The details of one or more implementations are set forth in the accompanying drawings and the description below. Other features will be apparent from the description and drawings, and from the claims.

DETAILED DESCRIPTION

The following description of examples includes details for illustrating embodiments and is not intended to limit the scope of the embodiments or to be exhaustive. For purposes of explanation, specific details are set forth in order to provide a thorough understanding of example embodiments. A person skilled in the art may appreciate that further embodiments may be practiced with details that differ from the specific details.

In addition to capabilities of services that are described within an ontology, further criteria may be used to select a service for a service request. Such further criteria may be specified by a requirement that a service has to fulfill in order to be selected. The requirement may specify characteristics that are independent of classes of the ontology so that the requirement is not a subclass of a class of the ontology. Embodiments address how service descriptions may be made accessible so that services may be selected according to their capabilities described by an ontology and according to a further requirement.

According to an embodiment, it may be possible to have a unified data structure, that is, the enhanced ontology, for selecting a service based on the service capability and on the requirement. In an example, a reasoner may be used for selecting a service for a specific service request. Using the enhanced ontology, a service may be selected in an efficient way for a service request. Such an efficient way may be faster at runtime than, for example, first selecting all services that are capable of fulfilling the service request and then selecting from the selected services a service for actually fulfilling the requirement. Such an efficient way may reduce required memory because only one data structure for selecting services may be required to be stored and maintained. Furthermore, the ontology may be enhanced in an automated way so that a user of the system may not be required to understand and maintain the complexity of an ontology. This may increase the reliability and usability of the system.

Figure 1:
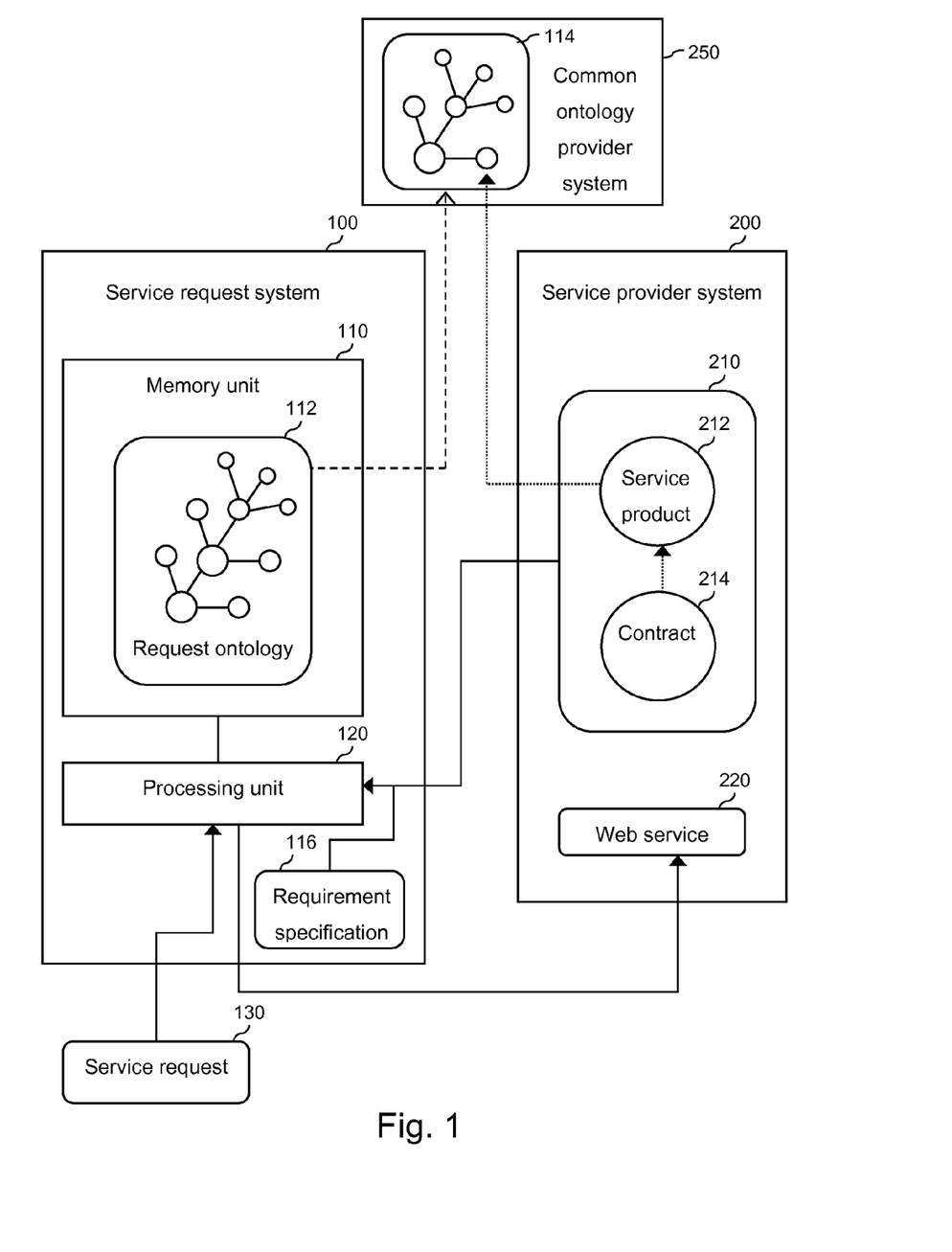
FIG. 1 is a block diagram of an example system according to an embodiment that interacts with further systems.

FIG. 1 is a block diagram of an example system 100 according to an embodiment that interacts with further systems. The system 100 may be a service request system 100 for generating an enhancement of a request ontology 112. The service request system 100 may include a memory unit 110, a processing unit 120, and a requirement specification 116. A service request 130 may be processed by the processing unit 120 of the service request system 100. The further systems include a service provider system 200 with parts 210 of a common ontology 114 and a web service 220. The parts 210 of the common ontology 114 include a class 212 representing a service product and a class 214 representing a contract. The further systems include the common ontology provider system 250 that provides the common ontology 114.

The service request system 100 may include as hardware a computer system, for example, a personal computer (PC), a server, a plurality of servers configured to execute software programs, or a mainframe computer system. The service request system 100 may include a client and a server related according to a client-server architecture or may include one or more computers arranged in a peer-to-peer architecture or a distributed architecture. In a further example, the service request system 100 may include a plurality of individual computer systems that are connected by the Internet or by an intranet of an entity such as for example a company or an organization.

The service request system 100 may run, for example by hosting and executing, a software program that configures the service request system 100 to have features according to an embodiment. Components or units of the service request system 100 may include software units that represent encapsulated or distributed instructions. Such software units may be executed by the hardware of the service request system 100 and execution may provide features of the units according to an embodiment. One or more units of the service request system 100 may be designed as Web applications.

The service provider system 200 may be embodied by a computer system that may be identical to, similar to, or different from the hardware of the service request system 100. The same may be true for the common ontology provider system 250. Data exchange between different systems may involve a communication infrastructure, for example, the Internet or an intranet of an organization or a group of organizations.

In an example, the memory unit 110 may be configured to provide the request ontology 112 to the processing unit 120 and to store the request ontology 112 with an enhancement. The request ontology 112 may be associated with a reference to the common ontology 114. In the figure, the reference is represented by broken arrow. In an example, the request ontology 112 may have been identical to the common ontology 114 prior to any enhancements. Subsequently, the request ontology 112 may have been enhanced with several generated classes. A line between the memory unit 110 and the processing unit 120 represents a communicative coupling between the memory unit 110 and the processing unit 120. Such a coupling may be used to exchange data related to the request ontology 112 in both directions. Complete lines with an arrow represent a communicative coupling configured to exchange data that may be input or output data in the indicated direction.

The processing unit 120 may be configured to identify a service specification being represented by a class of the request ontology 112. The service specification may describe a capability of the web service 220. In an example, the description may be according to the service product 212 or according to the contract 214. In an example, the contract 214 may be a more specific version of the service product 214. Accordingly, the contract 214 may be represented by a subclass of the class that represents the service product 212.

In an example, the service product 212 and the contract 214 may be represented by classes of the common ontology 114 and thus may also be a part of the request ontology 112. In a further example, the service product 212 and the contract 214 may be represented by classes of a service provider ontology that is derived from the common ontology 114. In such a case, the classes representing the service product 212 and the contract 214 may be provided directly to the processing unit 120 and added to the request ontology 112.

In an example, the service specification may be the service product 212 and may be publicly available and include a reference to the common ontology 114. The common ontology 114 may be a publicly available. In such a case, the service product 212 may have been published as a web service product to a service discovery component. The service request system 100 may have discovered the service product in the service discovery component.

In a further example, the service specification may be the contract 214 and may be private. The contract 214 may include one or more limitations from a contract specification that has been negotiated between a party using the service request system 100 and a party using the service provider system 200. In an example, the contract 214 may only be known to the two parties and accordingly may only be accessible to the service request system 100 and the service provider system 200. The contract may also have a reference to the common ontology 114 that may be publicly available.

The processing unit 120 may receive or access the requirement specification 116 and may incorporate the requirement specification 116 into a process for selecting services. For this, the processing unit 120 may be configured to compute a set of instances that are specified by the service specification, for example, the service product 212 and by the requirement specification 116. The set of instances may be one or more parameter ranges or individual, fully specified instances. The set of instances may be the intersection of the set specified by the service specification and the set specified by the requirement specification 116. The set of instances may be the complete intersection of the sets or may include only a subset of the intersection of the sets.

The processing unit 120 may be configured to enhance the request ontology 112 with a generated class that represents the set of instances in case that the set of instances has one or more instances. In case that the set of instances is empty no class may be generated and the request ontology 112 may not be enhanced.

The service request system 100 may access a first requirement specification 116 and process it together with different service specifications to obtain different sets of instances and accordingly different generated classes. The request ontology 112 may then be enhanced with the different generated classes. Following this, further requirement specifications may be used to be processed with the different service specifications. In such a case, priority values may be used to select a service.

For this, selection rules may be used with a condition part that specifies a condition and with an action part that specifies an action to be executed when the condition of the condition part is fulfilled. The generated class representing the computed set of instances may represent a condition part of a selection rule. Furthermore, the processing unit 120 may be configured to generate an action part of the selection rule using an identification of the web service 220. In an example, the action part may include the identification of the web service 220. In such a way, the selection rule may express the relation that the web service 220 is invoked when the condition part is fulfilled by a service request. The generated class representing the condition part may be related to the web service 220 identified in the action part because a class representing the specification of the service has been used for computing the generated class. Thus, the relation between the generated class and the web service 220 is represented by a selection rule having a condition part and an action part. The selection rule may be implemented implicitly through a connection between the generated class and the web service 220 or explicitly as a separate object. In any case, a selection rule may be prioritized according to further criteria to distinguish it from different selection rules related to different web services.

Furthermore, the processing unit 120 may be configured to compute a priority value for the selection rule related to the web service 220. The computation of the priority value may be according to a subset rule determining that a first condition part that specifies a first set of instances has a higher priority than a second condition part that specifies a second set of instances in case that the first set of instances is a subset of the second condition part. In an example, the computation of different priority values for different selection rules may be used to change an existing ordering of the different selection rules to refine the existing ordering. Such a refinement of the existing ordering may take into account that different condition parts may specify completely different characteristics of an ontology or may specify a subset of instances. When completely different characteristics are specified the existing ordering may not be changed. However, when a subset of instances is specified the condition part specifying the subset with respect to a different condition part may be required to have a higher priority value. More specifically, a characteristic specifying a weight of a parcel may be completely different from a characteristic specifying a size of a parcel. In such a case, further input may be used to clarify the relative priority. The further input may be provided by a user or by an analysis of former service requests and their fulfilment. However, a characteristic specifying as range a weight of more than 70 kg may be more specific than a characteristic specifying as range a weight of more than 50 kg. In such a case, the more specific specification may be required to have a higher priority because otherwise the more specific specification may not be usable to trigger an action. In a further example, the computation of different priority values for different selection rules may be used to create an ordering of the different selection rules for the first time. The priority values of the selection rules may be used to select one service from several services that are related to generated classes under which a service request has been subsumed at runtime.

Using the enhanced request ontology 112, the processing unit 120 may receive the service request 130 and apply a reasoner, such as RACER, FaCT, or Pellet, to subsume the service request 130 under a class of the request ontology 112. As a result of the subsumption, the reasoner may identify the most specific class that represents the service request 130. The identified class may be the generated class with which the request ontology has been enhanced. It may follow that the web service 220 is capable of fulfilling the service request 130 and that the requirement specification may also be fulfilled. In such a case, it may be possible to select the web service 220 in preference of a different web service.

For such a selection of a service at runtime the processing unit 120 may be configured to receive the service request 130 with a specification that is in accordance with the request ontology 112. Furthermore, the processing unit 120 may be configured to select the web service 220 in case that the service request 130 is subsumable under the generated class.

The web service 220 may be related to a priority value that has been assigned to the requirement specification according to an embodiment. However, further web services may be related to an identical priority value so that a further selection may be required at runtime of the selection process. In an example, the processing unit 120 may be configured to identify the web service 220 in a plurality of web services according to a runtime selection rule. The runtime selection rule may be any one of the following selection rules: selection of the service with the lowest price, selection of the service with the fastest execution, selection of the service with the highest reliability. Selecting a web service based on the runtime selection rule may include invoking one or more services to receive for example a price for the service. In a further example, the data required to apply the runtime selection rule may be stored in a separate list or component that relates the data to the potential services.

Figure 2A:
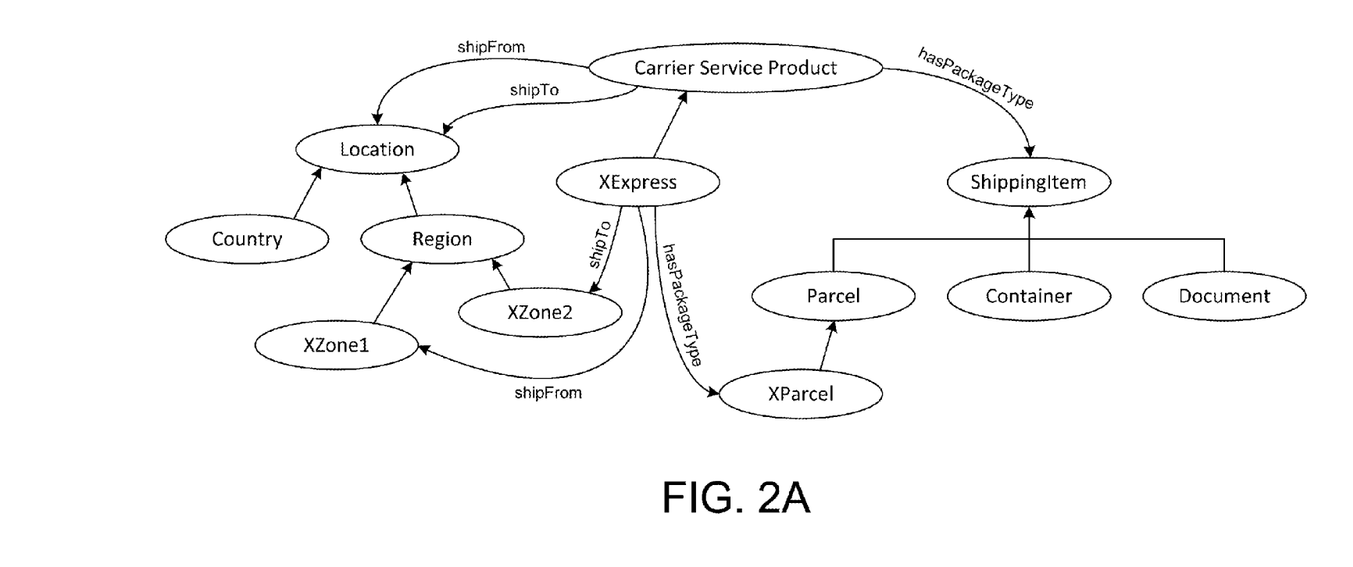
FIG. 2A is diagram of an example ontology with classes, characteristic relations, and inheritance relations.

FIG. 2A is diagram of an example ontology with classes, characteristic relations, and inheritance relations. Oval shapes represent classes, upward arrows represent an inheritance relation between two classes, and downward arrows represent characteristics of a class. The specifications of the characteristics are placed on the respective downward arrows.

In an example, the top class "Carrier Service Product" has three characteristics: "shipFrom", shipTo", and "hasPackageType". The class "XExpress" is a subclass of the top class "Carrier Service Product" and accordingly inherits the three characteristics. However, the range of the characteristics is more limited with respect to the top class "Carrier Service Product". An example is that the characteristic "shipFrom" has not "Location" as range but the more specific "XZone1" that may represent a subset of instances, that is, locations.

The example ontology may be used for a following scenario: a shipper of goods may use the service request system 100 to select transport services that are offered by different carriers and that are published as web services. The carriers may use a system such as the service provider system 200. The shipper may have service requests with varying transport requirements such as special sizes, different weights, or special transport conditions such as transport in upward position. A transport requirement may also include a combination of different specifications. Carrier service products may be represented by a class of the example ontology. In an example, the class "XExpress" may be a specific express service of a specific carrier. The service specification of the express service may be represented by the class "XExpress" and thus be limited in accordance to the characteristics of the class "XExpress".

Figure 2B:
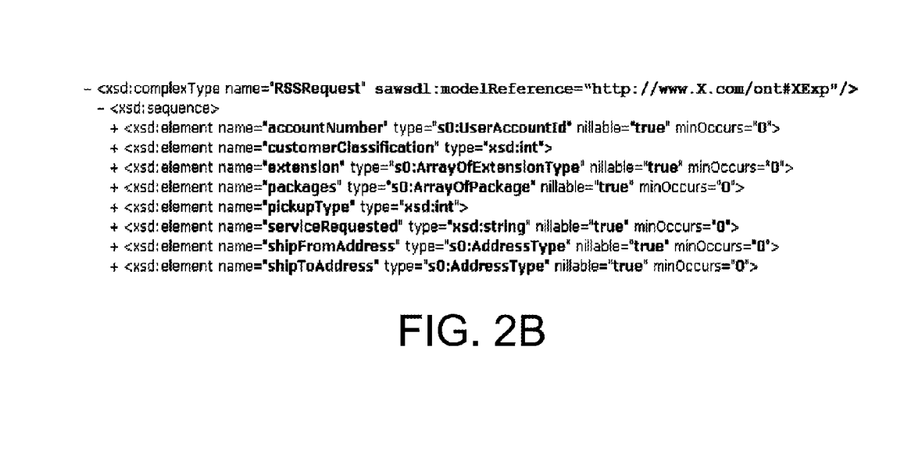
FIG. 2B is an example representation of a service request that is in accordance with an ontology and that has reference to the ontology.

FIG. 2B is an example representation of a service request that is in accordance with an ontology and that has reference to the ontology. The service request may be an example implementation of the service request 130 (see FIG. 1). The ontology that is referenced may be the common ontology 114 (see FIG. 1). In a further example, a different ontology such as the request ontology 112 (see FIG. 1) may be used as reference. The reference may specify, e.g., an Internet site on which the common ontology 114 can be found. In such a way, the specification of the service request may be implemented to be in accordance to with the request ontology 112. Such a reference may also be used as a reference for the request ontology 112 to the common ontology 114 or for the service product 212 and for the contract 214 to the common ontology 114.

Figure 3:
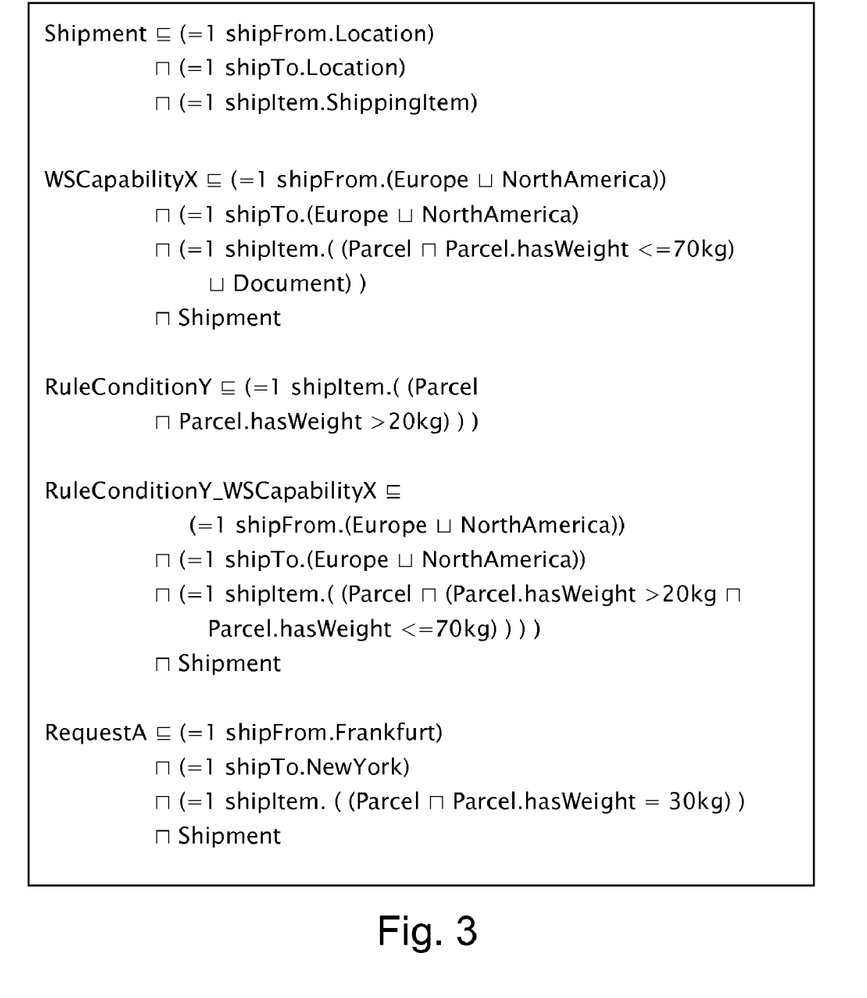
FIG. 3 is a list of example representations of elements that may be used according to embodiments.

FIG. 3 is a list of example representations of elements that may be used according to embodiments.

The first element, "Shipment", may be a top class of an ontology specified by the three characteristics, that is, "ship-From", "shipTo", and "shipItem" and corresponding ranges, that is, "Location", "Location", and "ShippingItem".

The second element, "WSCapabilityX", may be service specification describing a capability of a service or web service. According to the specification, the locations, the shipping item, and the weight are limited.

The third element, "RuleConditionY", may represent a requirement specification with a limitation to the shipping item and the weight but not subsumable under a class representing "WSCapabilityX".

The fourth element, "RuleConditionY_WSCapabilityX", may represent the set of instances that is specified by second element, "WSCapabilityX", and by the third element, "RuleConditionY". In an example, the fourth element, "RuleConditionY_WSCapabilityX", may be the intersection computed according to an embodiment and represented by a generated class with which the ontology is enhanced.

The fifth element, "RequestA", may represent a completely specified service request that may be subsumable under the class representing the fourth element, "RuleConditionY_WSCapabilityX". Therefore, a reasoner may be used to obtain a result in which the web service is selected that is related with or identified by the second element, "WSCapabilityX". This may be so because a service used to compute the set of instances is selected for the service request when the service request is subsumable under the generated class.

Figure 4A:
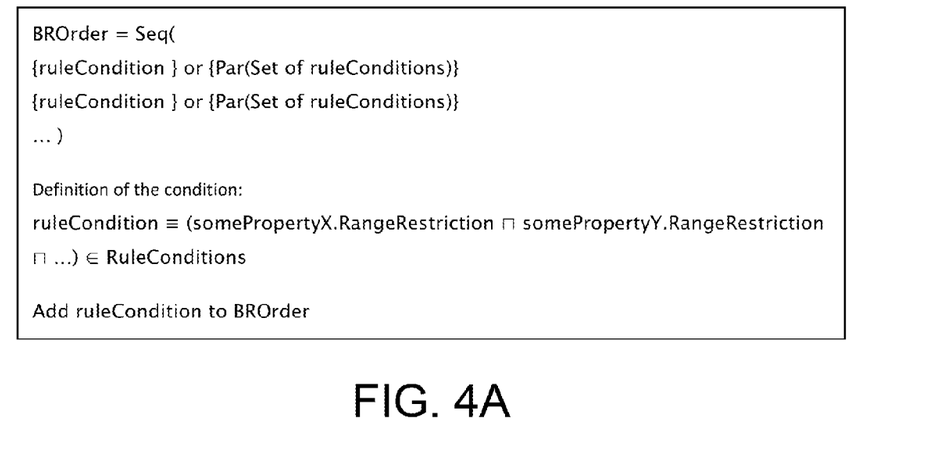
FIG. 4A is an example list of ordered or partly ordered conditions that may represent requirements according to an embodiment.

FIG. 4A is an example list of ordered or partly ordered conditions that may represent requirements according to an embodiment. The example list "BROrder" may be ordered or partly ordered so that a condition having a higher place in the list has a higher priority. Each "ruleCondition" may represent one condition and in an example, the conditions may be added one after the other to the example list. The example list may be created by a user knowing which conditions are important for selecting services. In a further example, the example list may be created by the service request system 100 (see FIG. 1) according to an analysis of past service requests with respect to specific transport requirements.

Figure 4B:
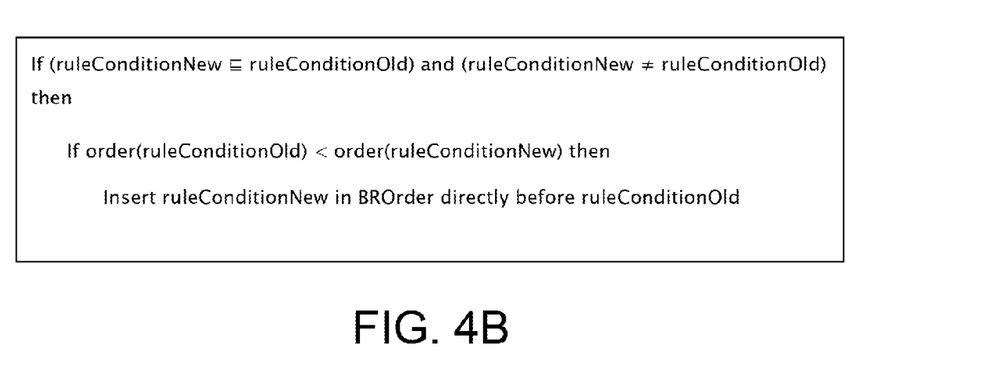
FIG. 4B is an example coding for preparing a computation of priority values for selection rules according to an embodiment.

FIG. 4B is an example coding for preparing a computation of priority values for selection rules according to an embodiment. The requirement specifications may be represented by the ruleConditions used in the example coding and ruleConditions may be used to compute condition parts of the selection rules. The example coding may use the ordered ruleConditions in the list "BROrder" and add a new ruleConditions, that is, "ruleConditionsNew", to the existing order of the list "BROrder". The resulting order of the ruleConditions may be used to order the conditions parts that are computed from the respective ruleConditions accordingly. From the order of the condition parts may follow the identical order of the selection rules to which the condition parts belong and thus priority values may be given to the selection rules that reflect the order positions of the selection rules. The adding of the new ruleCondition is according to the subset rule and therefore the computation of the priority values for the selection rules may be according to the subset rule. The example coding may assume correctly ordered condition parts in the list "BROrder" prior to adding the new ruleCondition. The example coding may start with the lowest order condition parts in the list "BROrder".

Figure 4C:
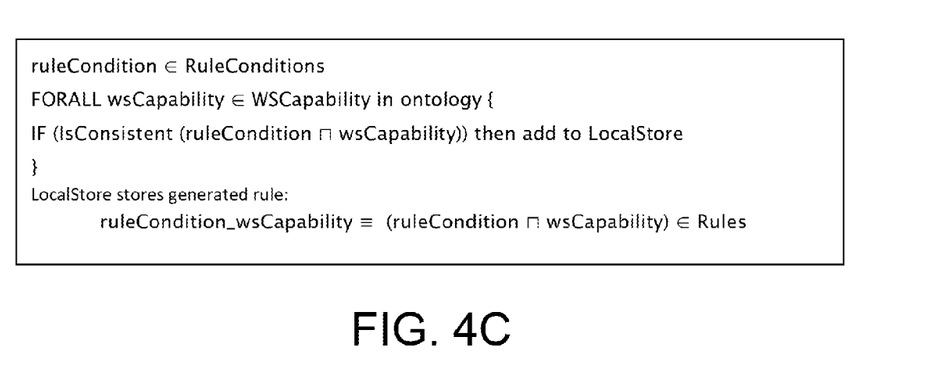
FIG. 4C is an example coding for computing sets of instances that may be represented by generated classes according to an embodiment.

FIG. 4C is an example coding for computing sets of instances that may be represented by generated classes according to an embodiment. According to the example coding, a "ruleCondition" is used to compute the sets of instances or intersections with each service specification that is represented by "wsCapability" and that is represented by a class of the request ontology 112 (see FIG. 1). For consistent or non-empty intersections a rule may be generated that may be represented by a generated class in the request ontology 112.

Figure 4D:
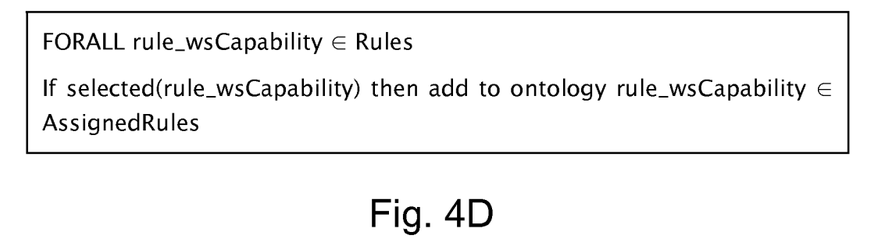
FIG. 4D is an example coding for enhancing an ontology with generated classes according to an embodiment.

FIG. 4D is an example coding for enhancing an ontology with generated classes according to an embodiment. In an example, the ontology may be the request ontology 112 and for each generated rule a generated class is used to enhance the request ontology 112 in order to represent the generated rule.

Figure 4E:
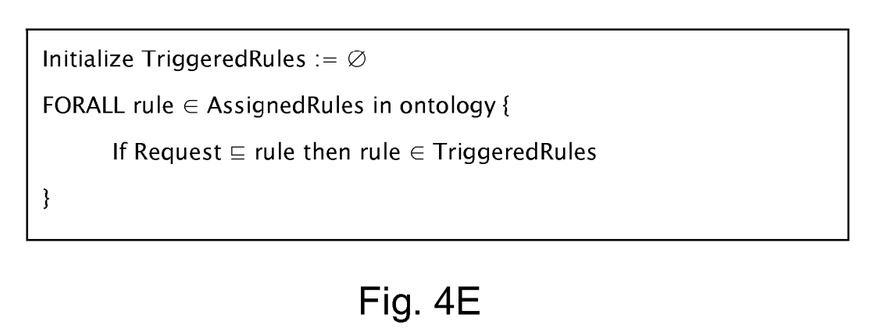
FIG. 4E is an example coding for selecting services for a service request at runtime according to an embodiment.

FIG. 4E is an example coding for selecting services for a service request at runtime according to an embodiment. Each element of the set of "TriggeredRules" may represent a condition part of a selection rule and according to the action part of the selection rule a service is identified to be used for fulfilling the service request. In a following operation the one or more selection rules with the highest priority value, that is, the lowest ordering number according to the position in the list "BROrder" may be selected from "TriggeredRules". When more than one selection rule is selected a runtime selection rule may be used to identify a single service that is finally invoked to fulfill the service request.

Figure 5:
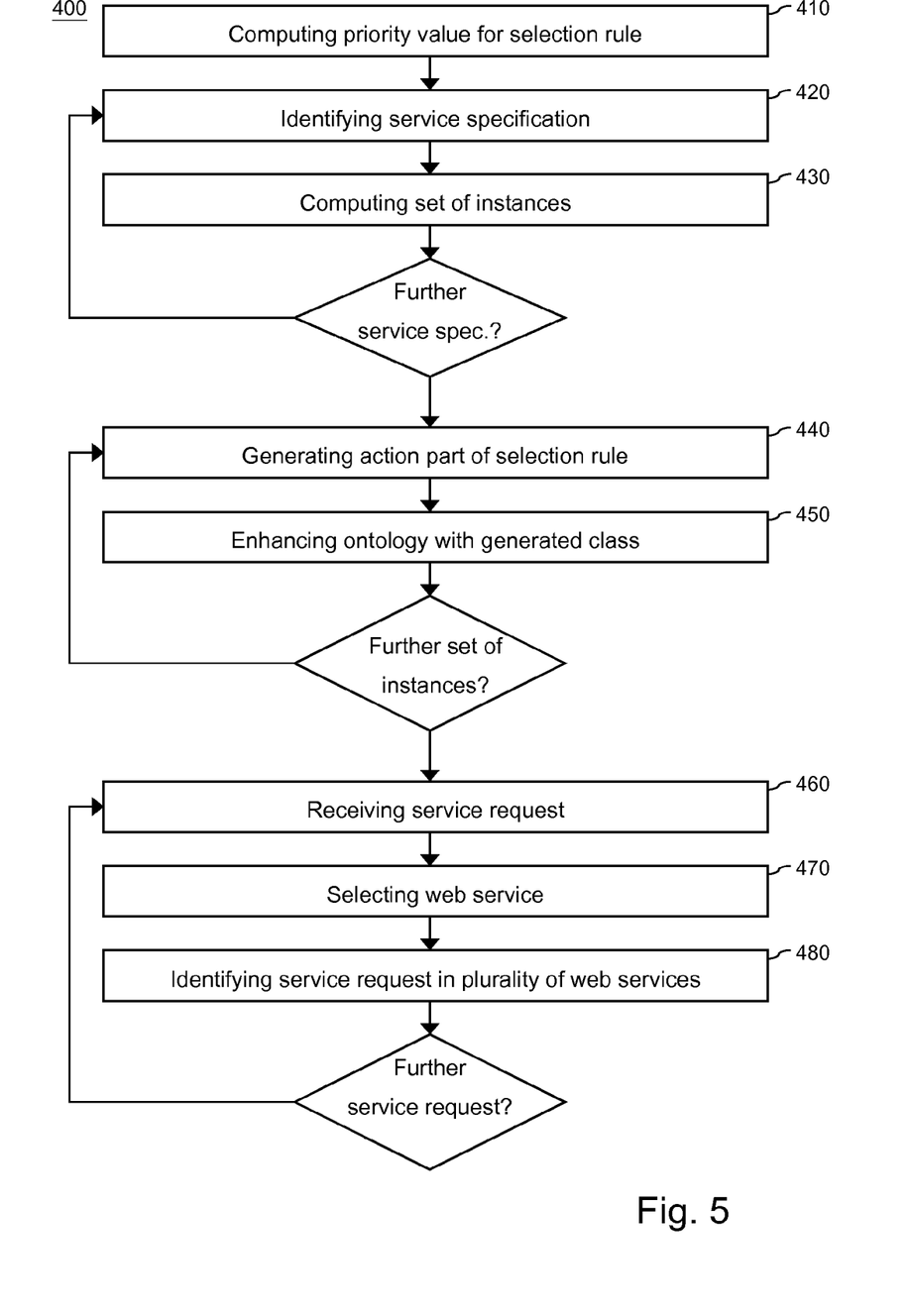
FIG. 5 is a flow diagram of a method according to an embodiment.

FIG. 5 is a flow diagram of a method 400 according to an embodiment. The method 400 may be a computer-implemented method 400 for generating an enhancement of an ontology. Operations of the method 400 may be executed in a different order when the operations are not depending on each other.

The method 400 may include computing 410 a priority value for a selection rule according to a subset rule. A selection rule may be defined by a selection part and an action part. The subset rule may include that a first condition part that specifies a first set of instances has a higher priority than a second condition part that specifies a second set of instances in case that the first set of instances is a subset of the second condition part.

Selection rules may be implicitly defined as a result of an embodiment: the selection part may be represented by a generated class with which the ontology is enhanced and the action part may be represented by an identification of a service that has been used to compute the generated class. Therefore, selection rules may be abstract objects that are stored as separate parts.

The method 400 may include identifying 420 a service specification being represented by a class of the ontology. The service specification may describe a capability of a service.

It may follow computing 430 a set of instances that are specified by the service specification and by a requirement specification. In an example, the operations identifying 420 and computing 430 may be repeated until all service specifications that are represented in the ontology are processed.

The method may include generating 440 an action part of a selection rule that has a condition part that corresponds to a computed set of instances. The action part may be generated using an identification of the service from which the set of instances has been computed.

It may follow enhancing 450 the ontology with a generated class representing the set of instances in case that the set of instances has one or more instances. The operations generating 440 and enhancing 450 may be repeated for all computed set of instances.

The method 400 may include at runtime of the service selection: receiving 460 a service request with a specification in accordance with the ontology. It may follow selecting 470 a service in case that the service request is subsumable under a generated class. The generated class may be related to the service because a class representing the specification of the service has been used for the computation of the generated class. Thus, the relation between the generated class and the service may be represented by a selection rule having a condition part and an action part.

The method 400 may include at runtime of the service selection: identifying 480 the service in a plurality of services according to a runtime selection rule. This may only be done when more than one service has been selected in a prior selecting 470 operation. The runtime selection rule may be any one of the following selection rules: selection of the service with the lowest price, selection of the service with the fastest execution, selection of the service with the highest reliability.

Service specifications used in method 400 may be publicly available or may be private and include one or more limitations from a contract specification. In either case, the services specifications may include a reference to a publicly available ontology. Such a reference to a publicly available ontology may be implemented in accordance with the reference to an ontology in a service request (see FIG. 2B).

Figure 6:
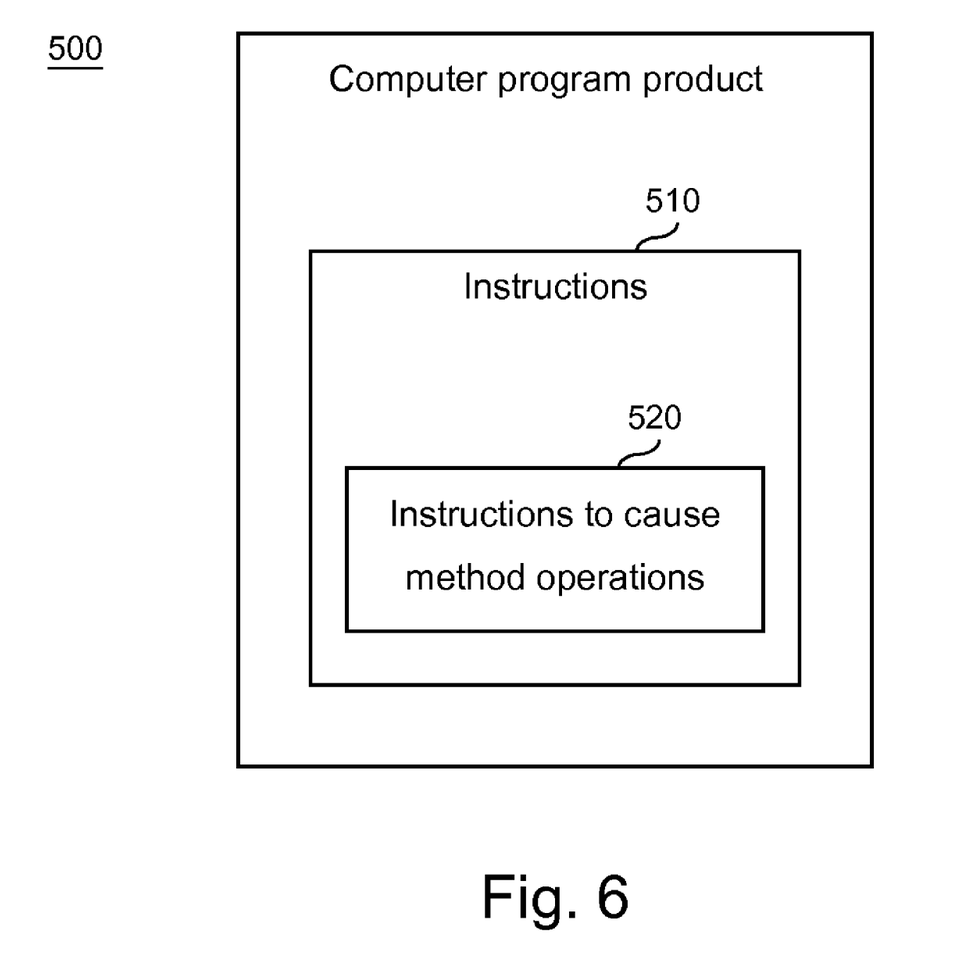
FIG. 6 is a block diagram of an example computer program product according to an embodiment.

FIG. 6 is a block diagram of an example computer program product 500 according to an embodiment. The computer program product 500 may be used for generating an enhancement of an ontology. The computer program product 500 may include instructions 510 that are executable by a computer system. The instructions 510 may include instructions 520 that may be configured to cause a computer system to execute operations of a method according to an embodiment. In an example, the method may be the method 400 (see FIG. 5).

Computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer-executable instructions into the executable format and a second computer may execute the transformed instructions. The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for generating an enhancement of a request ontology, the system comprising:
   a memory unit configured to provide the request ontology and to store the request ontology with the enhancement; and
   a processing unit configured to:
      identify a service specification being represented by a class of the request ontology, the service specification describing a capability of a service,
      compute a set of instances that are specified by the service specification and by a requirement specification describing at least one characteristic for selecting the service that is independent of the class of the request ontology,
      enhance the request ontology with a generated class representing the computed set of instances specified by the service specification and by the requirement specification, wherein the generated class represents a condition part of a selection rule based on the at least one characteristic for selecting the service, and
      generate an action part of the selection rule using an identification of the service so that a relation between the generated class and the service is represented by the selection rule having the condition part and the action part,
      wherein the condition part of the selection rule specifies a condition based on the at least one characteristic for selecting the service and the action part of the selection rule specifies an action to be executed when the condition of the condition part is fulfilled.

2. The system of claim 1, wherein the processing unit is further configured to compute a priority value for the selection rule according to a subset rule, the subset rule including that a first condition part that specifies a first set of instances has a higher priority than a second condition part that specifies a second set of instances in case that the first set of instances is a subset of the second condition part.

3. The system of claim 1, wherein the service specification is publicly available and comprises a reference to a publicly available ontology.

4. The system of claim 1, wherein the service specification is private and comprises one or more limitations from a contract specification and a reference to a publicly available ontology.

5. The system of claim 1, wherein the processing unit is further configured to receive a service request with a specification in accordance with the request ontology and to select the service in case that the service request is subsumable under the generated class.

6. The system of claim 5, wherein the processing unit is further configured to identify the service in a plurality of services according to a runtime selection rule.

7. The system of claim 6, wherein the runtime selection rule includes any one or more of the following selection rules: selection of the service with the lowest price, selection of the service with the fastest execution, selection of the service with the highest reliability.

8. A computer-implemented method for generating an enhancement of an ontology, the method comprising:
   identifying a service specification being represented by a class of the ontology, the service specification describing a capability of a service;
   computing a set of instances that are specified by the service specification and by a requirement specification describing at least one characteristic for selecting the service that is independent of the class of the request ontology;
   enhancing the ontology with a generated class representing the computed set of instances specified by the service specification and by the requirement specification, wherein the generated class represents a condition part of a selection rule based on the at least one characteristic for selecting the service; and
   generating an action part of the selection rule using an identification of the service so that a relation between the generated class and the service is represented by the selection rule having the condition part and the action part,
   wherein the condition part of the selection rule specifies a condition based on the at least one characteristic for selecting the service and the action part of the selection rule specifies an action to be executed when the condition of the condition part is fulfilled.

9. The method of claim 8, further comprising computing a priority value for the selection rule according to a subset rule, the subset rule including that a first condition part that specifies a first set of instances has a higher priority than a second condition part that specifies a second set of instances in case that the first set of instances is a subset of the second condition part.

10. The method of claim 8, wherein the service specification is publicly available and comprises a reference to a publicly available ontology.

11. The method of claim 8, wherein the service specification is private and comprises one or more limitations from a contract specification and a reference to a publicly available ontology.

12. The method of claim 8, further receiving a service request with a specification in accordance with the ontology and selecting the service in case that the service request is subsumable under the generated class.

13. The method of claim 12, further identifying the service in a plurality of services according to a runtime selection rule.

14. The method of claim 13, wherein the runtime selection rule includes any one or more of the following selection rules: selection of the service with the lowest price, selection of the service with the fastest execution, selection of the service with the highest reliability.

15. A computer program product for handling transaction information, the computer program product being tangibly embodied on a computer-readable medium and including executable code that, when executed, is configured to cause a data processing apparatus to:
   identify a service specification being represented by a class of the ontology, the service specification describing a capability of a service;
   compute a set of instances that are specified by the service specification and by a requirement specification describing at least one characteristic for selecting the service that is independent of the class of the request ontology;

enhance the ontology with a generated class representing the computed set of instances specified by the service specification and by the requirement specification, wherein the generated class represents a condition part of a selection rule based on the at least one characteristic for selecting the service; and generate an action part of the selection rule using an identification of the service so that a relation between the generated class and the service is represented by the selection rule having the condition part and the action part, wherein the condition part of the selection rule specifies a condition based on the at least one characteristic for selecting the service and the action part of the selection rule specifies an action to be executed when the condition of the condition part is fulfilled.

16. The computer program product of claim 15, wherein the executable code, when executed, is further configured to cause the data processing apparatus to:

compute a priority value for the selection rule according to a subset rule, the subset rule being that a first condition part that specifies a first set of instances has a higher priority than a second condition part that specifies a second set of instances in case that the first set of instances is a subset of the second condition part.

17. The computer program product of claim 15, wherein the service specification is publicly available and comprises a reference to a publicly available ontology.

18. The computer program product of claim 15, wherein the service specification is private and comprises one or more limitations from a contract specification and a reference to a publicly available ontology.

19. The computer program product of claim 15, further receiving a service request with a specification in accordance with the ontology and selecting the service in case that the service request is subsumable under the generated class.

20. The computer program product of claim 15, wherein the executable code, when executed, is further configured to cause the data processing apparatus to:

identify the service in a plurality of services according to a runtime selection rule, wherein the runtime selection rule includes any one or more of the following selection rules: selection of the service with the lowest price, selection of the service with the fastest execution, selection of the service with the highest reliability.

* * * * *